(12) United States Patent
Hoefler

(10) Patent No.: US 8,887,654 B2
(45) Date of Patent: Nov. 18, 2014

(54) FLOATING PLATFORM

(75) Inventor: Johannes Hoefler, Birsfelden (CH)

(73) Assignee: Heliovis AG, Wiener Neudorf (AT)

( * ) Notice: Subject to any disclaimer, the term of this patent is extended or adjusted under 35 U.S.C. 154(b) by 155 days.

(21) Appl. No.: 13/582,565

(22) PCT Filed: Mar. 2, 2011

(86) PCT No.: PCT/AT2011/000100
§ 371 (c)(1),
(2), (4) Date: Sep. 4, 2012

(87) PCT Pub. No.: WO2011/106810
PCT Pub. Date: Sep. 9, 2011

(65) Prior Publication Data
US 2012/0325137 A1 Dec. 27, 2012

(30) Foreign Application Priority Data
Mar. 5, 2010 (AT) .................................. 356/2010

(51) Int. Cl.
| B63B 35/44 | (2006.01) |
| E04H 15/20 | (2006.01) |
| B63B 7/06 | (2006.01) |
| F24J 2/52 | (2006.01) |
| F24J 2/14 | (2006.01) |

(52) U.S. Cl.
CPC . *B63B 7/06* (2013.01); *Y02E 10/47* (2013.01); *F24J 2/5269* (2013.01); *F24J 2/145* (2013.01); *B63B 35/44* (2013.01); *Y02E 10/45* (2013.01); *B63B 2035/4453* (2013.01)
USPC ........................................... 114/264; 52/2.23

(58) Field of Classification Search
CPC ................ B63B 35/44; B63B 35/4413; B63B 2035/4453; B63B 7/06; Y02E 10/727; Y02E 10/47; Y02E 10/45; F05B 2240/95; A01G 31/00; F24J 2/145; F24J 2/5269
USPC .......... 114/264, 266, 346; 52/2.11, 2.22, 2.23
See application file for complete search history.

(56) References Cited

U.S. PATENT DOCUMENTS 3,344,764 A * 10/1967 Ziermann ..................... 114/121
4,350,143 A    9/1982 Laing et al.
(Continued)

FOREIGN PATENT DOCUMENTS

| DE | 101 56 184 | 6/2003 |
| DE | 10 2006 01975 | 10/2007 |

(Continued)

OTHER PUBLICATIONS

International Search Report of PCT/AT2011/000100, date of mailing Jul. 1, 2011.

(Continued)

*Primary Examiner* — Lars A Olson
*Assistant Examiner* — Anthony Wiest
(74) *Attorney, Agent, or Firm* — Collard & Roe, P.C.

(57) ABSTRACT

Floating platform (1) having a flat cover element (2) and a sealing element (3), which is connected to the cover element (2), makes a sealing contact with a liquid surface (4) during operation and encloses a closed cavity (5) together with the cover element (2) and the liquid surface (4) or a bottom surface, in which cavity (5) an overpressure which supports the cover element (2) can be produced by a compressed-air production apparatus (5'), with at least one circumferential wall (6) being provided as the sealing element (3), and having a sealing section (3') which projects into the liquid during operation.

20 Claims, 13 Drawing Sheets

(56) References Cited

U.S. PATENT DOCUMENTS

Figure 1A:
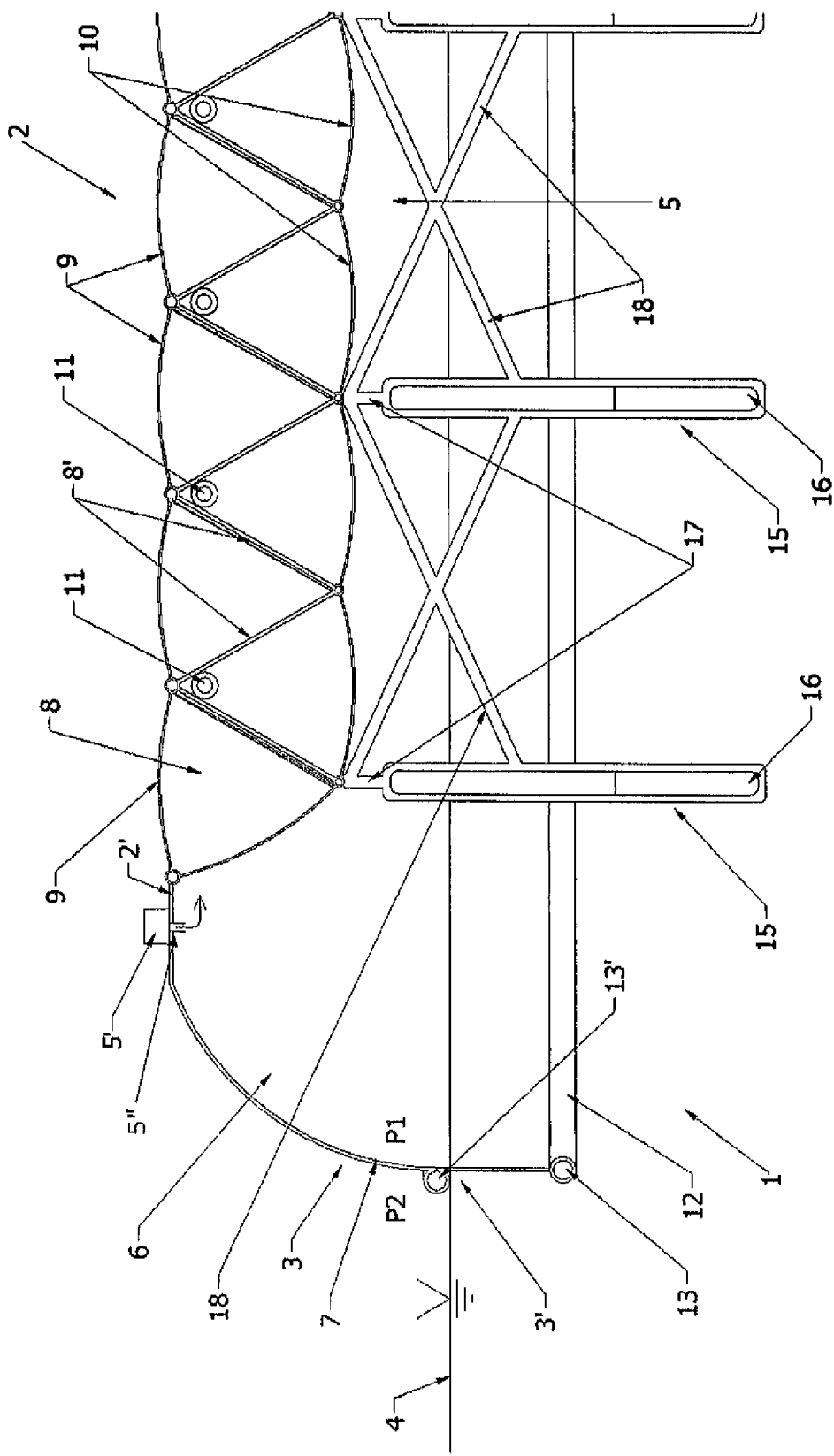

| | | | |
|---|---|---|---|
| 5,524,549 A * | 6/1996 | Morris | 114/264 |
| 2008/0115715 A1 | 5/2008 | Del Tosto et al. | |
| 2009/0223508 A1 | 9/2009 | Hinderling | |

FOREIGN PATENT DOCUMENTS

| | | |
|---|---|---|
| EP | 1 925 548 | 5/2008 |
| FR | 2 471 564 | 6/1981 |
| JP | 59-089 471 | 5/1987 |
| WO | WO 96/34793 | 11/1996 |
| WO | WO 2009/001225 | 12/2008 |

OTHER PUBLICATIONS

International Preliminary Report on Patentability of PCT/AT2011/000100.

Austrian Patent Office Search Report A 356/2010 dated Sep. 15, 2010, with English translation of relevant parts.

* cited by examiner

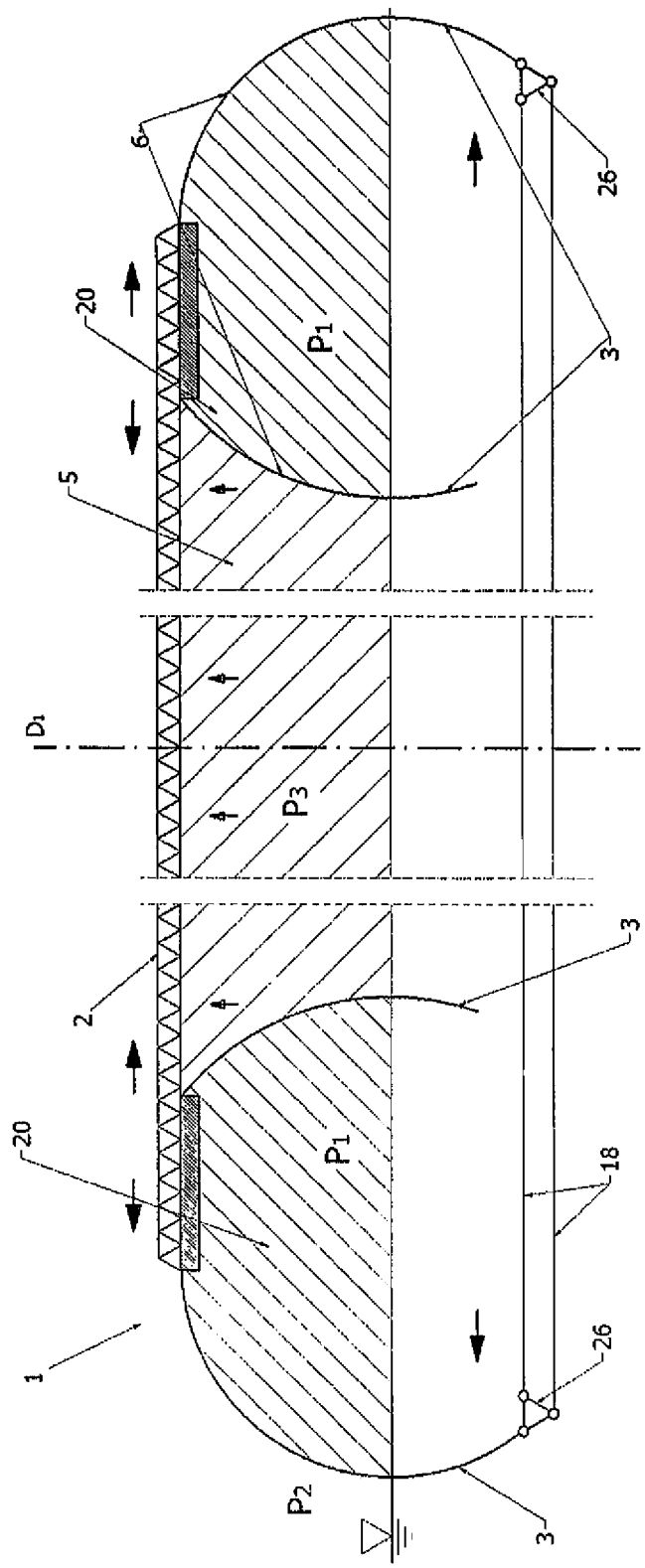

FLOATING PLATFORM

CROSS REFERENCE TO RELATED APPLICATIONS

This application is the National Stage of PCT/AT2011/000100 filed on Mar. 2, 2011, which claims priority under 35 U.S.C. §119 of Austrian Application No. A 356/2010 filed on Mar. 5, 2010, the disclosure of which is incorporated by reference. The international application under PCT article 21(2) was not published in English.

The present invention relates to a floating platform having a flat cover element and a sealing element, which is connected to the cover element, makes a sealing contact with a liquid surface during operation and encloses a closed cavity together with the cover element and the liquid surface or a bottom surface, in which cavity an overpressure which supports the platform is producible by a compressed-air production apparatus.

WO 2009/001225 A2 discloses a floating platform having a large-area cover element on which solar panels are arranged. The platform comprises a ring-shaped floating body by means of which the platform is supported in a water body or an artificially built basin. The cover layer is fastened to the upper side of the ring-shaped floating body and seals along with the floating body a volume to the underground in an airtight manner. In order to keep the cover layer at a particular distance above the water surface or the bottom surface, respectively, an air cushion is produced in the enclosed volume by means of a compressor. Depending on the operating region the floating body has to be of very tough design to be able to resist the alternating motions of the water surface, in particular the motions of the sea, when the platform is used in a natural water body. There is especially the problem that the motions of the sea may have a disturbing effect on the stability and/or the orientation of the platform that is basically to be positioned stationary and to be tracked selectively with respect to the position of the sun. It is a disadvantage of the bulky ring-shaped floating body that it has a very large area of attack for wave movements at its underside, which may impair the stability of the arrangement.

FR 2 471 564 A1 discloses a solar panel with a plurality of separate, elongate chambers that are composed to form a round shape. The chambers enclose a closed space along with the roof of the construction, said closed space being filled with compressed air so as to carry the inherent weight of the panel. The undersides of the laterally arranged chambers are connected with a torus-shaped frame buoying upwards in a ring-shaped channel. A ring-shaped ballast is suspended from the underside of the frame. The torus-shaped frame, however, comprises the disadvantages explained in the context with WO 2009/001225 A2 in particular as regards lacking stability with respect to wave movements.

US 2009/223508 A1 discloses an artificial island comprising a torus-shaped frame for support. A disadvantage of this prior art is that there is also provided a torus-shaped frame offering a very large area of attack for wave movements particularly at its underside.

U.S. Pat. No. 4,350,143 A discloses a different solar energy plant formed as a floating platform. For generating the required buoyancy, floating bodies are provided which are designed as air-filled conducts.

JP 59-089 471 A illustrates a different floating frame structure for a solar plant, comprising a plurality of ropes that are tensioned like a checkerboard between the frame and are connected with floating bodies at which generator elements are arranged.

In view of this, it is an object of the invention to provide a floating platform of the initially mentioned kind which is cost-efficient to manufacture and of simple construction and which comprises high stability with respect to alternating environmental influences such as strong wind and wave movements.

This is achieved by the floating platform of the initially indicated kind in that at least one circumferential wall is provided as a sealing element having a sealing section which projects into the liquid during operation.

Accordingly, pursuant to the invention there is provided a wall-shaped sealing element limiting the enclosed cavity laterally toward the outside. During operation, the cover element is arranged at a particular height above the liquid surface, wherein the cover element is supported by the cavity filled with a gas with overpressure below the cover element. The sealing section of the circumferential wall immerses into the liquid, usually water or fluids with a higher boiling point, and thus establishes a sealing contact with the liquid, so that the exit of gas from the enclosed cavity is prevented during normal operation. By the fact that the wall sealingly contacts the surface of the liquid, the gas pressure may be maintained in the closed cavity with little energy expenditure for operating the compressed-air production apparatus. The compressed-air production apparatus may, for instance, be a pump or a compressor by means of which compressed air is introduced via an inlet line into the cavity below the cover element. The wall-shaped flat cover element has advantageously merely a very small cross-section area, so that the disturbing influence of waves on the stability and/or orientation of the platform is reduced substantially. The circumferential wall may be manufactured in a cost-efficient manner with few raw materials and supplies in almost any dimension. The platform according to the invention may be referred to for different fields of use. A particularly preferred embodiment of the platform provides a floating solar power plant, wherein preferably one or a plurality of solar panels in combination with an inverter, a steam turbine or the like for converting the incident solar radiation in particular into electric energy are provided at the cover element. The floating platform may, however, also be used, for instance, as a landing platform for aircraft, in particular helicopters and airplanes.

With respect to a particularly efficient isolation of the large-area cover element from the wind and/or wave forces attacking in particular at the sides in the region of the sealing element it is favorable if a particularly ring-shaped flexible membrane is provided as a circumferential wall. The flexible membrane may yield to the wave movements, so that only very low forces are transferred to the platform itself, i.e. in particular the cover element. This embodiment is of particular advantage if the platform is subject to rough sea without protection, for instance, if the platform is operated in high seas. The flexible membrane makes use of the principle known from seaweed which is based on the fact that the rolling movement of the waves is yielded to in a flexible manner without the attacking forces being incorporated and transferred to the platform. In correspondence with the rolling movement of the surrounding fluid particles, every place of the membrane remains at its original position in temporal average. Advantageously, casual drift-off movements are compensated by sufficiently large reset forces of the flexible membrane. In order to prevent the membrane from tearing on reaching its elastic limit, the membrane may be connected with an incorporated and/or laminated knitted fabric preventing further elongation and absorbing forces exceeding the maximum elasticity of the membrane.

In a particularly stable, cost-efficient embodiment a rigid material, preferably a sheet metal part, is provided as a circumferential wall. The rigid construction of the wall almost completely prevents a deformation of the sealing element in longitudinal direction. Accordingly, this embodiment always ensures that the sealing element immerses to a sufficient depth into the liquid to guarantee the sealing contact with respect to the enclosed cavity. Since the rigid construction of the wall as compared to a flexible membrane results in a higher vulnerability to the mechanical influences by wind and wave movements, this embodiment is particularly suited for wind and/or wave-protected plants, for instance, for solar plants on shore.

For a stable supporting of the platform on the liquid surface it is favorable if the sealing element connects up to the edge of a cover surface of the cover element. Accordingly, the sealing element is angled from the edge of the substantially horizontally arranged cover surface of the cover element toward the liquid surface. The, for instance, ring-shaped sealing element is preferably arranged substantially perpendicular to the liquid surface.

In order to reliably avoid the undesired passage of gas from the closed cavity to the environment it is of advantage if the sealing element is formed integrally with at least the edge of the cover surface of the cover element. The integral forming of the sealing element with the edge region of the cover surface of the cover element largely prevents leaking at the joints between the sealing element and the cover element in continuous operation.

In a preferred embodiment of the platform there is provided that the closed cavity is divided into at least two partial chambers by at least one further sealing element. By providing at least two partial chambers supplied with compressed air independently of each other, it is possible to ensure the stability of the platform even in the case of a pressure loss in one of the partial chambers. Moreover, it is favorable if a control of the compressed-air production apparatus is adapted to set a respectively different pressure in the partial chambers. If the partial chambers are arranged asymmetrically, it is possible to tilt the platform if required by a different pressure impact of the partial chambers, i.e. to swivel it about a horizontal axis extending in the main extension plane of the cover element. The platform may, for instance, be tilted to discharge rain water that has accumulated on the cover element to the environment and to thus ensure the stability of the platform, in particular the desired height of the cover element above the liquid surface.

For dividing the closed cavity it is particularly expedient if the partial chambers form an outer and an inner circular ring that are preferably arranged concentrically. In the case of a pressure loss in the outer or the inner circular ring the large-area cover element is still supported by the air cushion confined by the other circular ring. As a matter of course, there may be provided three or more circular rings that are in particular arranged concentrically, depending on the use and the size of the cover element. Reliability may be further increased in an advantageous manner if the outer ring is divided into a plurality of segments.

In order to keep the effects of a gas leak on the stability of the platform as low as possible, it is of advantage if the closed cavity is divided by a plurality of sealing elements that are arranged substantially in the shape of a honeycomb or a checkerboard.

For a reliable sealing of the gas-filled cavity from the environment it is of advantage if the sealing section of the sealing element is weighted down by at least one ballast element, in particular of metal or concrete. The ballast element tensions the sealing section of the sealing element which projects into the liquid. This way, the immersion depth of the sealing element into the liquid which is required for maintaining the sealing contact is always ensured even under difficult conditions. The ballast element is preferably manufactured of metal or concrete. However, with a view to a particularly cost-efficient production, industrial residues such as waste, slag or if need be glazed ashes may also be provided. Moreover, combinations of the materials mentioned are also conceivable such as, for instance, concrete concrete aggregates and/or metal/concrete containers. In this respect, sand may be filled into appropriately shaped bodies. For forming and/or supporting the ballast element, the wall-shaped sealing element may be manufactured of a material with a specific weight that is higher than the specific weight of the surrounding liquid, for instance, PVC or fluoropolymers in water. In order to further weight down the sealing element that is partially manufactured of a material with a relatively high specific weight, one of the afore-mentioned heavy fillers such as sand or metal may be integrated in the sealing element.

In order to offer as little resistance as possible to the impinging waves it is of advantage if the sealing section of the sealing element comprises a plurality of regions that are each weighted down with a ballast element and that are each separated by a region of the sealing section of the sealing element which is free from the ballast element.

For achieving a mutually movable arrangement of the regions of the particularly membrane-shaped wall which are weighted down with the ballast element it is favorable if the sealing section of the sealing element is folded or undulated in the region that is free from the ballast element. The weighted-down regions of the membrane-shaped wall are adapted to be displaced against each other, so that it is prevented that tensions in the sealing element that are transferred to the platform are formed in the sealing element in particular in the case of waves approaching diagonally.

With respect to an embodiment of simple construction it is of advantage if a chamber of the membrane filled with a ballast material, in particular sand or concrete, is provided as a ballast element which is preferably formed at a free end region of the sealing section. Accordingly, the ballast material is preferably integrated in the membrane. If the filled chamber of the membrane is provided at the free end region of the sealing section which is immersed into the liquid, an optimum tensioning of the sealing element along the entire longitudinal extension thereof may be achieved. In a further preferred embodiment the ballast elements are separated from the sealing element, wherein the connection of each ballast element with the sealing element is preformed via a suitable fastening means, for instance, a rope or the like.

For supporting the sealing element it is of advantage if the sealing section of the sealing element comprises a buoyancy element formed in particular by a further chamber of the flexible membrane. The further chamber integrated in the flexible membrane may be filled with air or with a buoyant gas, for instance, a noble gas. Preferably, the buoyancy element comprises a plurality of interruptions and/or subdivisions, wherein it is particularly expedient if the buoyancy element extends above a respective region of the sealing section of the sealing element which is weighted down with a ballast element and is interrupted at the regions free from the ballast element. Accordingly, the sealing element may be supported completely or at least partially by the buoyancy element in order to relieve the pressure-impacted cavity below the cover element. For forming the buoyancy element it may be favorable in the case of an alternative embodiment if the upper region of the sealing section of the sealing element is manufactured of a material having a lower specific weight than that of the surrounding liquid such as, for instance, polypropylene in water. This way, it is possible to support and/or replace a separate buoyancy element.

For a stable positioning of the platform on the liquid surface it is favorable if the cover element or the sealing element, respectively, is connected with at least one floating or buoyant body that is immersed at least partially in the liquid during operation. For generating a buoyancy force the floating body may comprise one or a plurality of cavities filled with air and/or another gas. The floating or buoyant body may, on the one hand, be provided in the kind of a conventional buoy in the region of the liquid surface. In many cases it is, however, favorable if the floating or buoyant body is predominantly, in particular also completely, immersed into the liquid. If the floating or buoyant body is positioned in deeper water layers during operation, the wave energy reduced with respect to the liquid surface may be used for stabilization of the platform. The floating or buoyant bodies are preferably dimensioned such that they are capable of supporting the cover element at least temporarily if the pressure supply of the gas cushion below the cover element is interrupted.

With respect to a stabilization and/or support of the platform it is in particular of advantage if an elongate, in particular tubular, buoy is provided as a floating or buoyant body. During operation, the elongate buoy is arranged substantially perpendicular to the liquid surface, wherein the elongate buoy penetrates the water surface with the one end thereof. The comparatively small cross-section of the tubular buoy in the kind of a so-called spar buoy offers only very little resistance to the approaching waves, so that the forces acting laterally on the buoy are comparatively low. Due to their small cross-sections, the elongate or tubular buoys offer a small target to the waves. Moreover, a moment of inertia of the buoy corresponding to the elongate shape of the buoy and/or a possibly available deep ballast enables a particularly position-stable arrangement of the elongate buoy in deeper immersed sections even in cases in which the upper section thereof is subject to high lateral forces. This way, a very stable arrangement of the platform may achieved during operation, which is of substantial importance in particular if the platform is used as a floating solar plant with respect to the energy yield achievable, or for safety reasons if the platform is used as a landing platform for aircraft.

For stabilizing the platform it is favorable if the cover element or the sealing element, respectively, is connected with at least one stabilization body in the kind of a drift anchor that is immersed at least partially in the liquid during operation. The stabilization body may preferably comprise a surface oriented substantially in parallel to the liquid surface during operation, which offers high resistance to vertical wave movements for stabilizing the platform. If the stabilization body comprises vertical faces protruding in different directions, resistance may additionally be offered to the forces acting laterally on the platform (e.g. wind gusts). Such stabilization bodies acting in all directions in space are preferably used.

At the underside of the sealing section of the sealing element there may be provided a separate dive buoy or a dive buoy integrated in the particularly membrane-shaped wall, respectively, which is preferably connected with one or a plurality of stabilization bodies or assumes the function thereof so as to stably position the lower edge of the sealing section of the sealing element irrespective of the introduced wave forces in the still depths of the liquid.

The dive buoy may be connected with the cover element via ropes and compression-resistant structures such as rods, tubes, and frameworks or the like so as to stably maintain the relative position to the cover element and/or the desired height of the cover element above the liquid surface. Moreover, these connections render it possible that the cover element is supported at least temporarily if the pressure supply of the gas cushion below the cover element is interrupted. To this end, for instance, additional buoyant cushions in the kind of airbags may also be provided which inflate in an emergency case so as to generate the additionally required buoyancy.

The pressure difference between the cavity and the environment causes a radially acting force on the cover element which attempts to bulge the cover element outwardly in a ball-shaped manner since this constitutes the energetically most favorable shape. Such a deflection of the cover element due to the pressure difference, however, is to be avoided if possible. In addition to the inherent stiffness of the cover element, various effects may be referred to for this purpose in a coordinated manner. The internal pressure in the cavity causes a force deforming the cover element only if the pressure becomes too high or too low. As long as the cover element is positioned substantially horizontally and the surface weight of the cover element corresponds exactly to the pressure difference, the forces acting radially inwardly will disappear. However, the pressure in the cavity may often be adjusted with limited accuracy only. The circumferential sealing element offers targets to the internal pressure for generating a force acting radially outwardly, which may, however, due to the proportions between the diameter and the height of the platform, not be sufficient in some cases. Advantageous additional measures for stabilizing the arrangement are (i) buoys that are connected with the cover element from the bottom and counteract a spacing apart of the cover element from the liquid surface by their inherent weight, (ii) reinforcement structures engaging at the sealing element and/or at the buoys and reinforcing the platform, for instance, in the form of a ring or in the kind of a wire spoke wheel, and (iii) the impacting of individual partial chambers of the cavity with different pressures such that the generated tensions act radially outwardly, for instance, by an increased pressure between an outer and a somewhat further inward concentric ring-shaped sealing element in the kind of a pneumatic tire. The locally higher pressure may in this case be opposed by a likewise locally higher surface weight.

For the even distribution of forces attacking laterally at the platform or acting radially, as they occur in particular during a swiveling of the platform about a vertical axis or due to sea currents, wind forces, or the relocation of the platform to new places of installation, it is favorable if a particularly ring-shaped reinforcing element such as a rope, a rod, a tube, a framework, or the like is provided at the bottom edge of the sealing element. Possible ballast bodies, dive buoys, and drift anchors that may be formed partially or completely by the reinforcing element may also be fastened to the reinforcing element. It is furthermore particularly advantageous if further sealing elements that divide the cavity into partial chambers each have such reinforcing element available.

In addition, it is of advantage if in the case of a cavity divided into partial chambers the further sealing element or the available floating or stabilization body, respectively, is connected in a force-fit manner with the annular circumferential reinforcing element so as to distribute vertical and horizontal forces evenly to the entire platform.

With respect to an even stabilization of the platform it is of advantage if a plurality of floating bodies and/or stabilization bodies is fastened annularly at the sealing element or is arranged substantially symmetrically with respect to a vertical axis of symmetry of the cover element.

The fastening of the floating and/or stabilization bodies at the platform is preferably performed via a compression-resistant connecting element, in particular a tube, a rod, a framework, or the like. In addition, it is often favorable if the floating and/or stabilization bodies are adapted to be tensioned by means of a submersible anchor element in the kind of a so-called "tension leg platform" toward the ground of the water body with tensile load.

In order to distribute the impacting forces evenly to the floating and/or stabilization bodies it is favorable if at least two floating and/or stabilization bodies are connected with each other via connecting elements, in particular tubes, rods, ropes, or frameworks. By the mutual connection of the floating and/or stabilization bodies it is possible to avoid load peaks. In addition, one or a plurality of these floating and/or stabilization bodies may be connected in a force-fit manner with the reinforcing element of the sealing element.

In order to be able to change the orientation of the platform if necessary, it is favorable if the height of the cover element is adjustable in particular by an adjustable buoyancy force of the floating body and/or a chamber of the membrane, or is mounted to be rotated about an axis of rotation extending in the main extension plane of the casing. Accordingly, it is possible to tilt the platform which, on the one hand, enables to have rain water run from the cover surface of the cover element into the liquid. In one embodiment of the platform as a solar plant, a uni-axial tracking depending on the time-varying position of the sun can be achieved by swiveling the cover element about a horizontal axis. The swiveling of the platform is preferably performed by a local variation of the buoyancy force acting on the platform. This may, on the one hand, be performed in that, preferably controlled by control means, additional buoyant bodies are advanced into the liquid at one side of the platform or the buoyancy force of available buoyant bodies is increased, for instance, in that a cavity enclosed in the interior of the buoyancy body is increased by the introduction of additional gas. For swiveling the platform, on the other hand, the gas pressure prevailing in a hollow chamber of the circumferential membrane may be increased or decreased unilaterally, respectively. By increasing or decreasing, respectively, the buoyancy force acting in total on the platform, the distance between the cover element and the liquid surface and/or the bottom surface may additionally be adjusted. In the case of a particularly rough sea, for instance, it is possible to space the cover element further apart from the water surface.

In addition, it is of advantage in particular if the platform is used as a solar plant if the platform is rotatable about an axis arranged substantially perpendicular to the main extension plane of the cover element or to the liquid surface, respectively. Such twisting of the platform may particularly be used for tracking with respect to the position of the sun. The twisting is preferably performed with a drive device, for instance, a motor in combination with a ship propeller engaging below the liquid surface at the sealing element or a floating and/or stabilization body, respectively. The drive device may additionally be designed such that it is possible for the platform to reach its place of installation independently. Otherwise, the platform may be dragged to its destination with a separate towing vehicle. In doing so, regions that are favored by the season or by the weather are searched in order to enable a highly efficient operation in particular when the platform is used as a solar plant. In particular it is also conceivable that the platform operated as a solar plant is directly connected to an industrial consumer (e.g. an aluminum smelter) which renders it possible to achieve high annual yield.

In order to be able to discharge wind forces impacting laterally at the platform to stationary fixed points it is of advantage if the cover element and/or the sealing element is connected, via a tensile element, with a slide mounted to be displaced in a rail element positioned at the bottom surface. The tensile elements such as in particular ropes, chains, or the like which are tensioned diagonally to the fixed points engage the movable sledge that is guided in the rail element mounted at the bottom surface. Rollers, sliding contacts, magnetic cushions or air cushions may, for instance, be used for the rail element.

Alternatively, the rail element may be fastened to the cover surface or to the sealing element of the platform, respectively, wherein laterally impinging forces are discharged via the tensile elements to the floating and/or stabilization bodies acting as fixed points.

The afore-described platform may, on the one hand, be designed for use in a natural water body, for instance, the sea.

With respect to an embodiment of the platform as a shore-based facility it is favorable if the liquid into which the sealing element immerses is an artificially built fluid volume on shore, in particular at least one circular or ring-shaped basin.

Particularly advantageous for basins on shore is the use of a low-viscous liquid that does not evaporate in the climate of the installation, preferably does not merge with dirt particles, and is resistant to biological, chemical, and physical decomposition. Examples of this are specific ionic liquids and synthetic oils, in particular silicone oils.

Figure 1B:
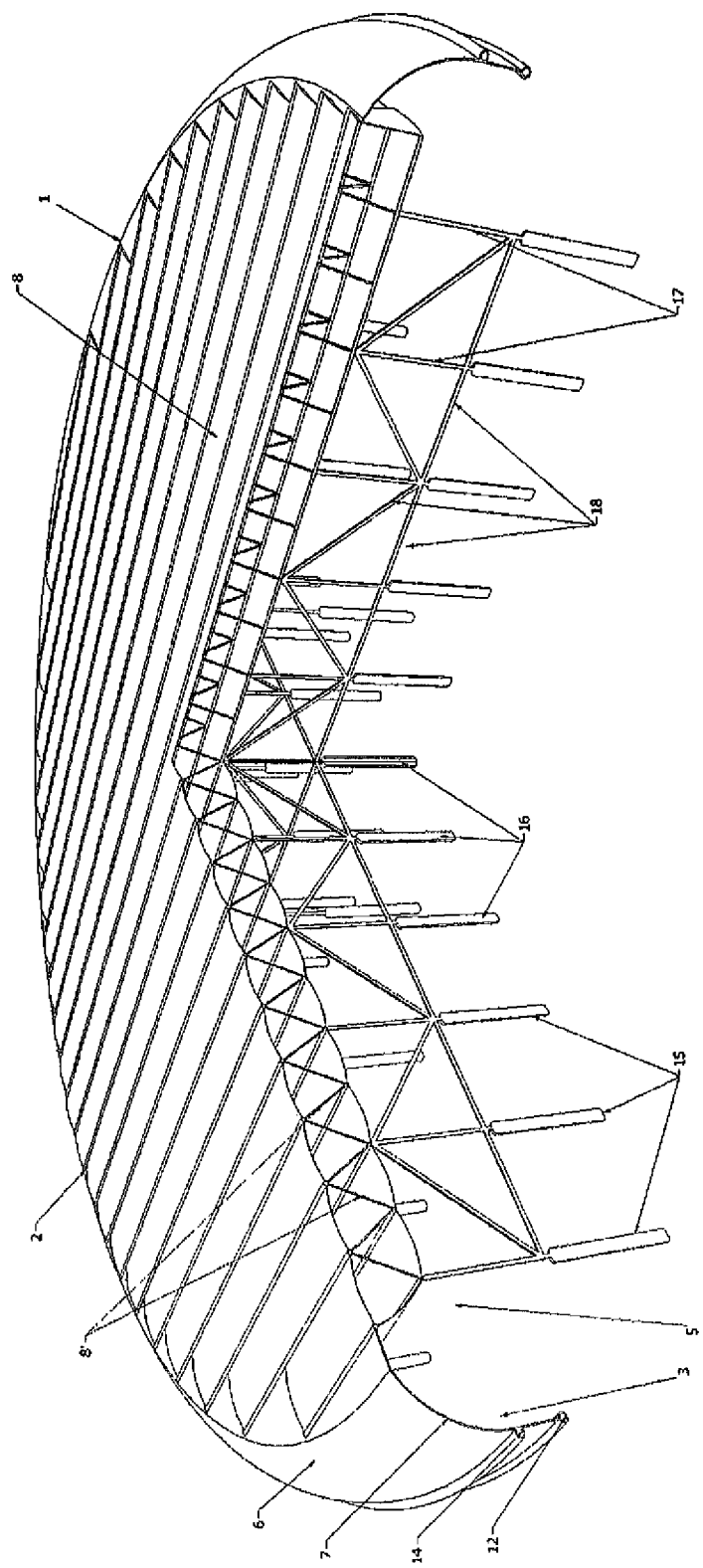
Figure 2:
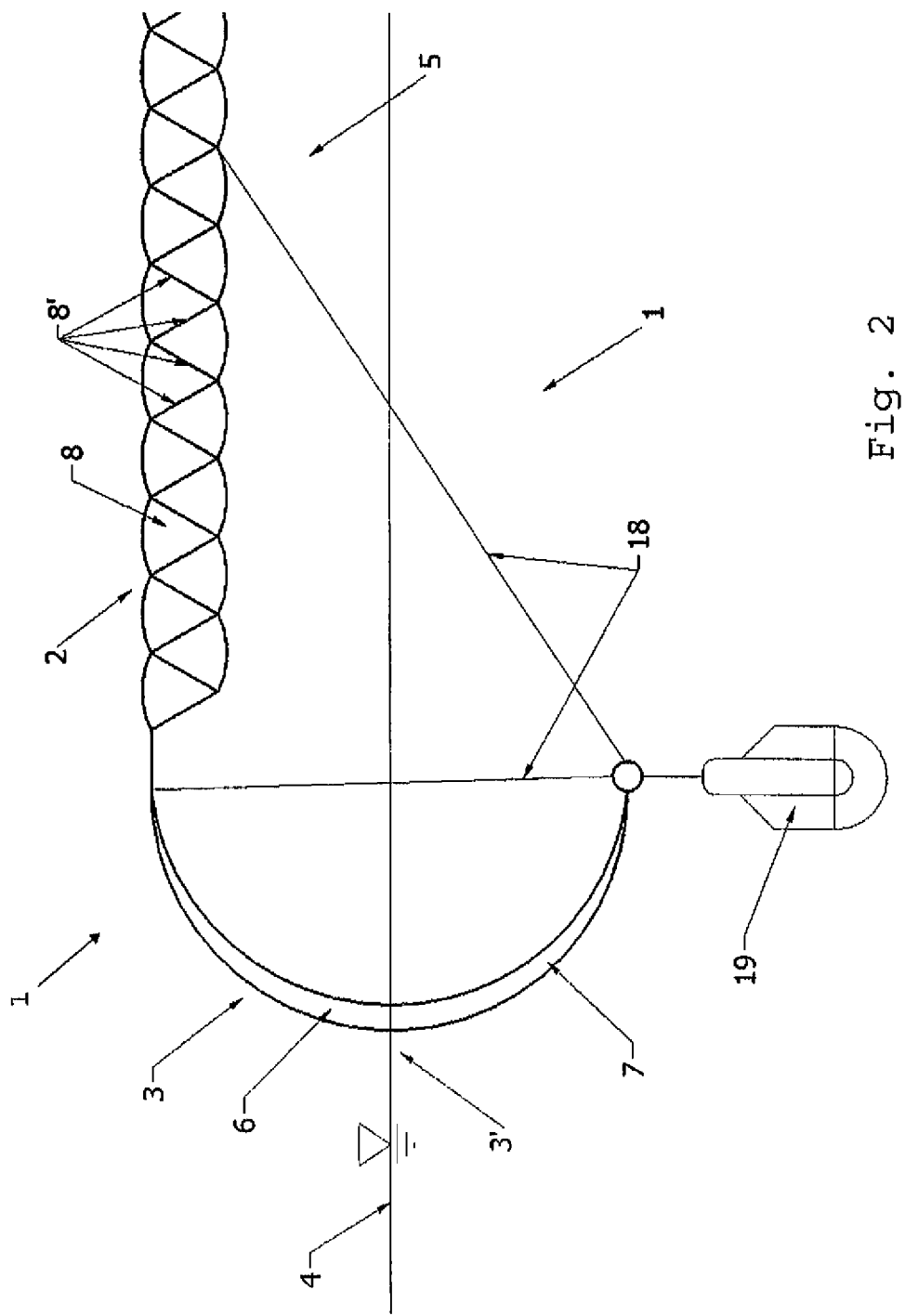
Figure 3A:
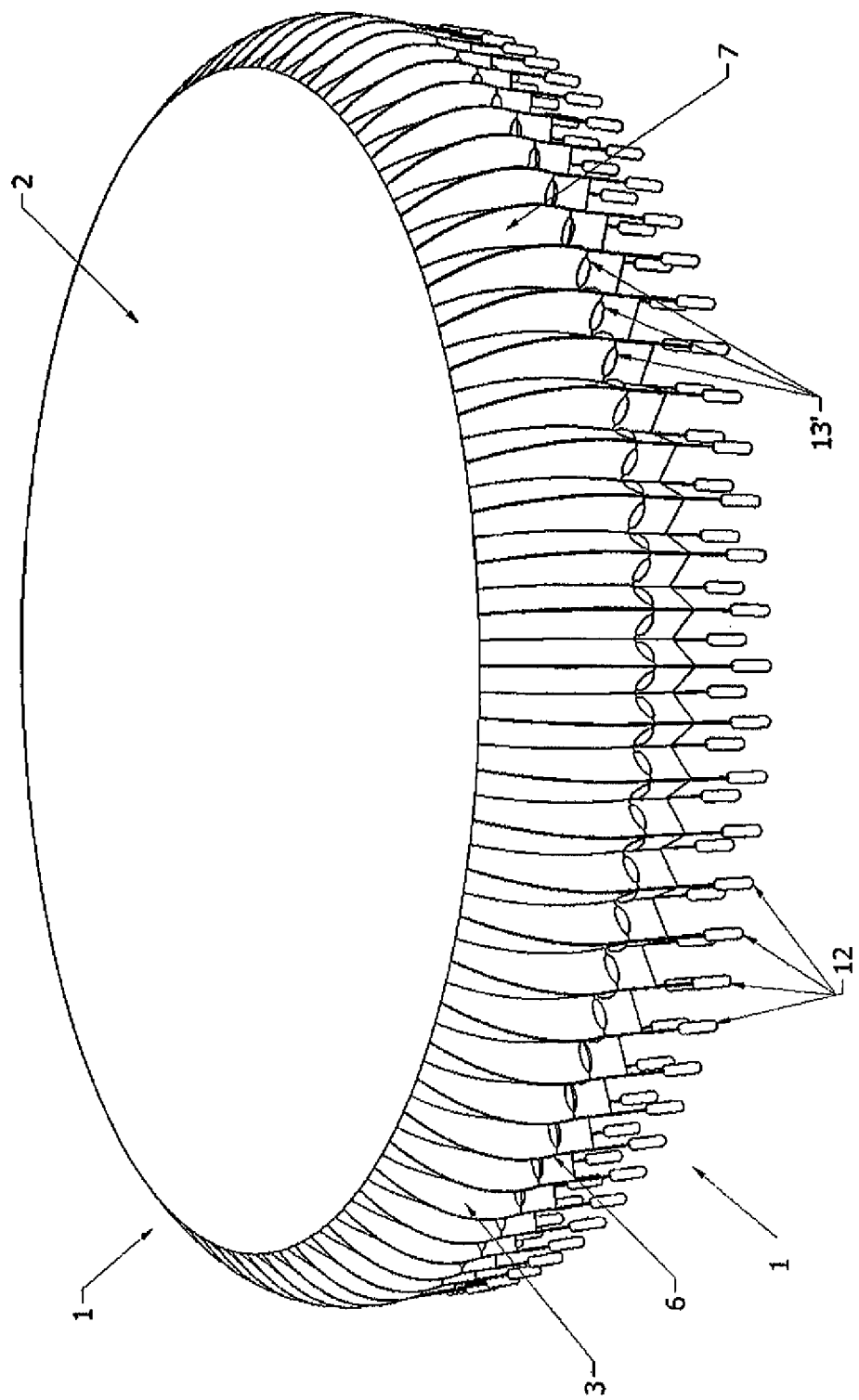
Figure 3B:
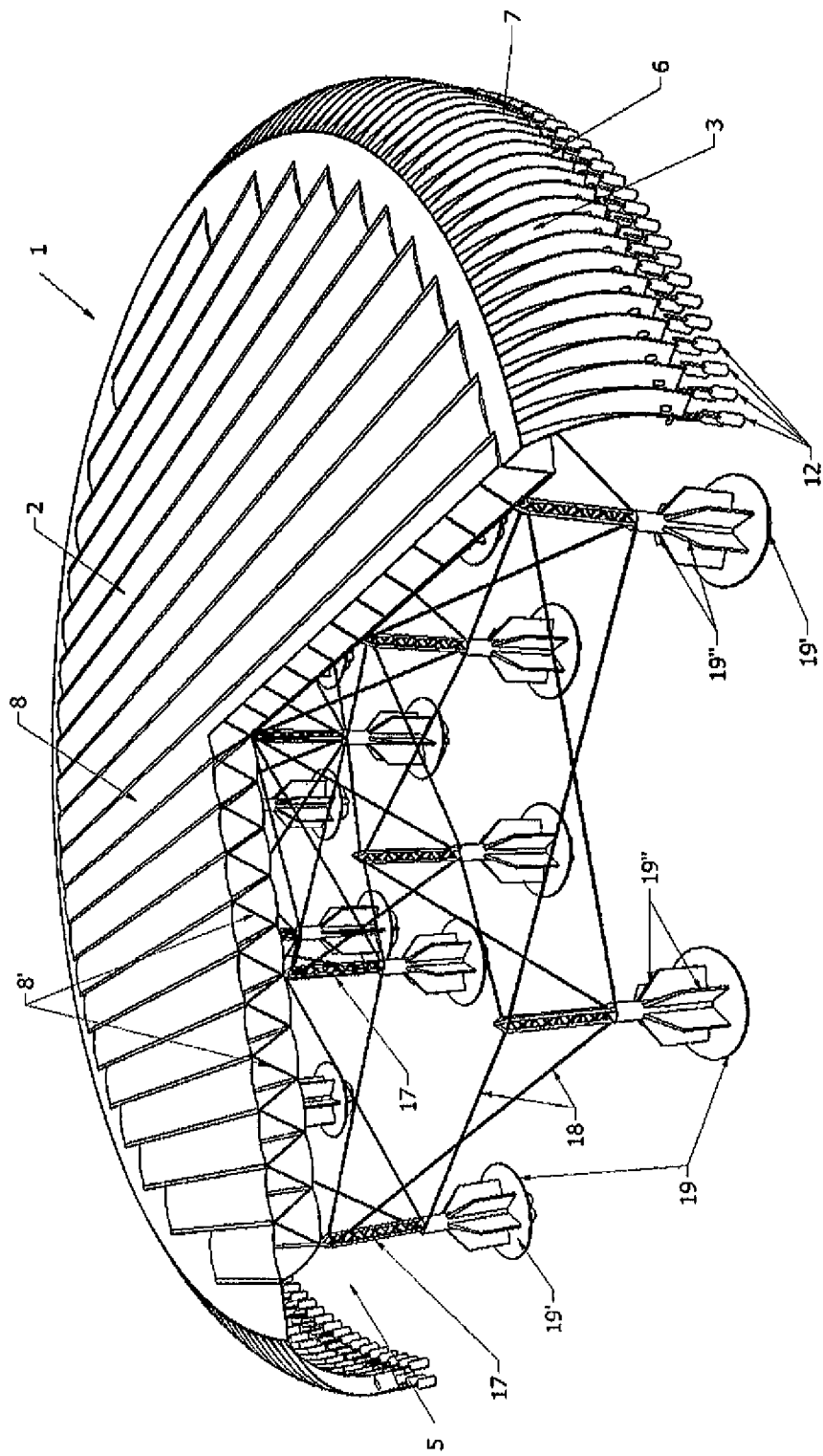
Figure 3C:
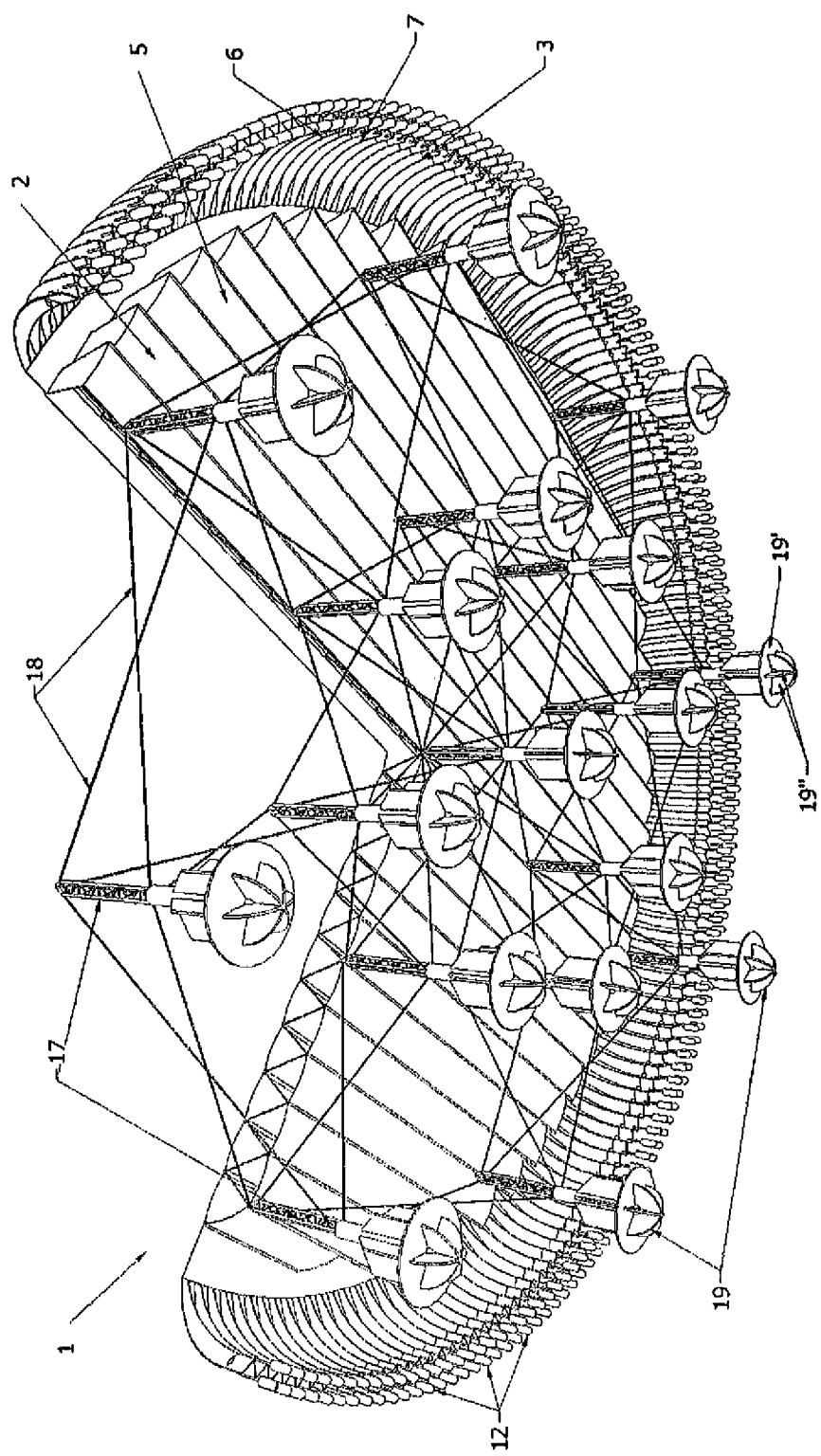
Figure 3D:
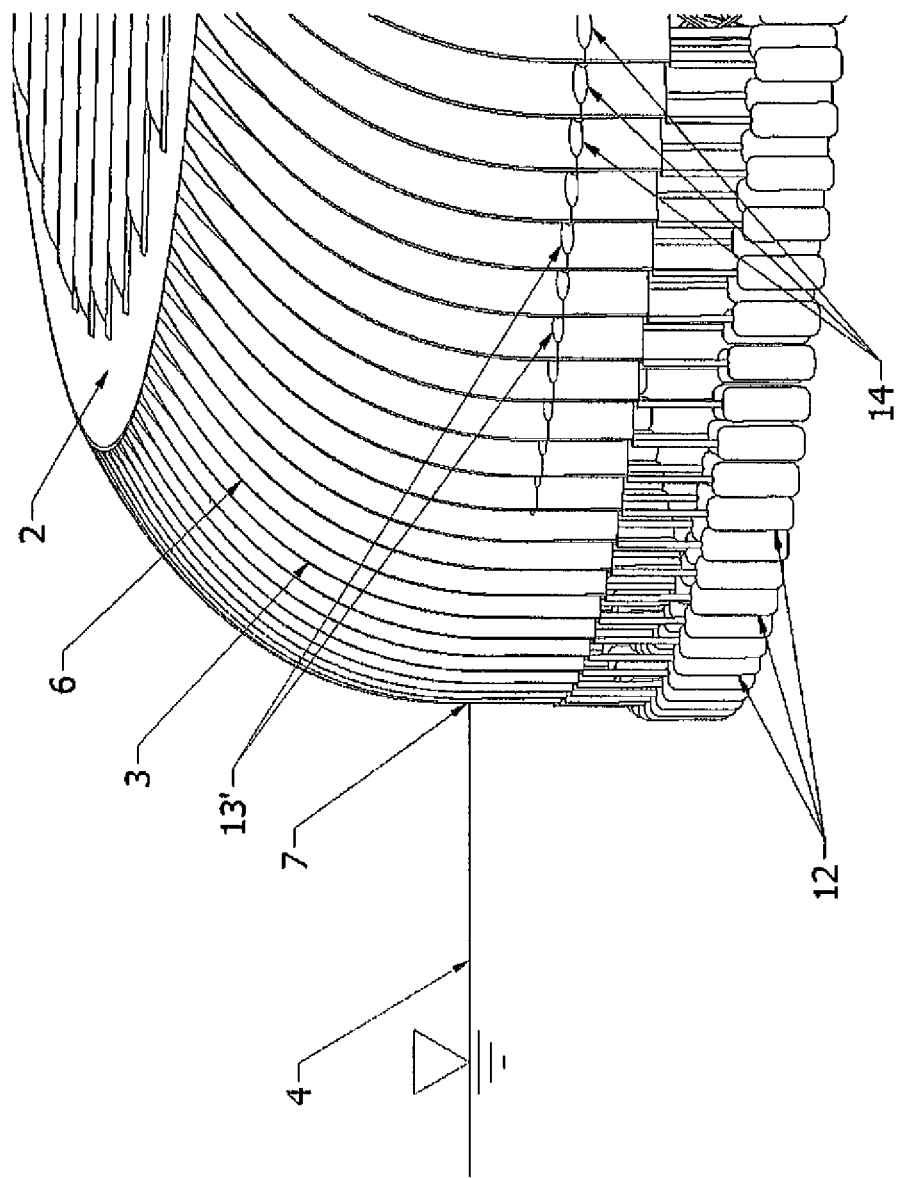
Figure 4A:
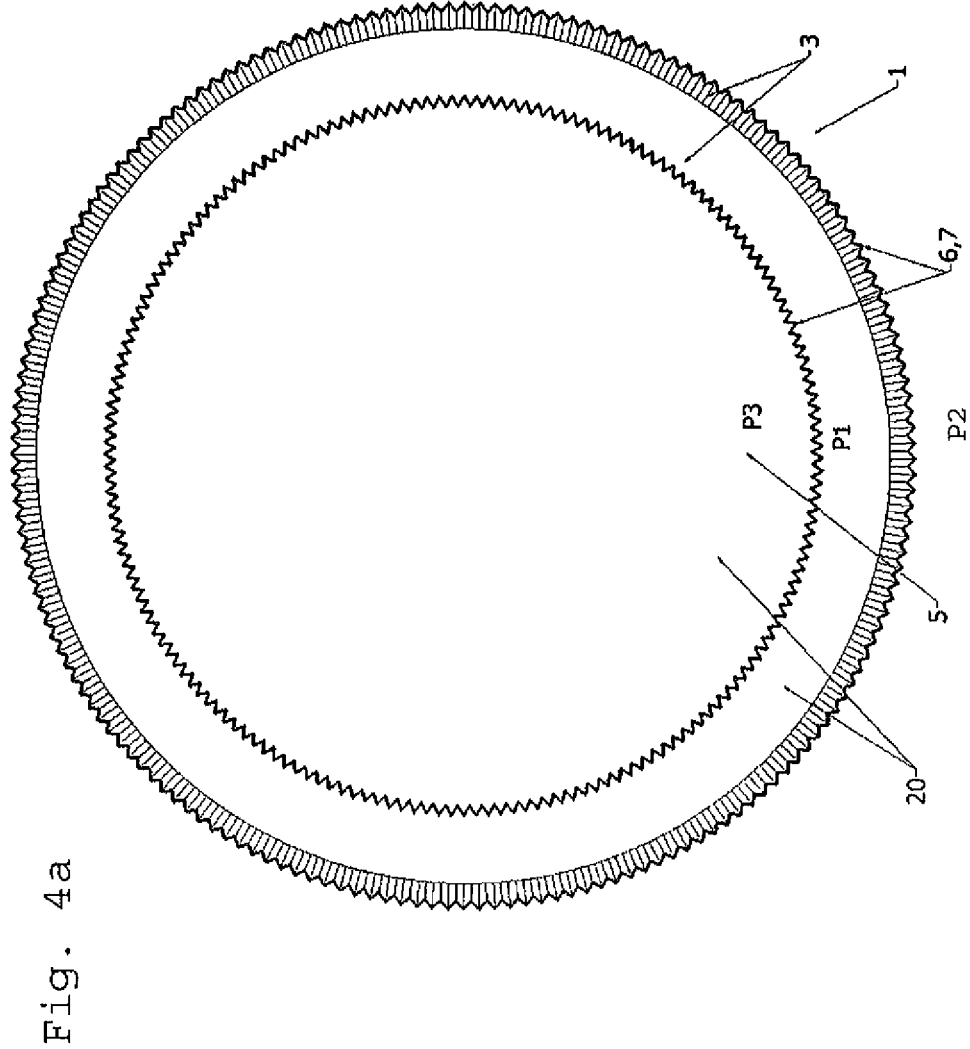
Figure 4B:
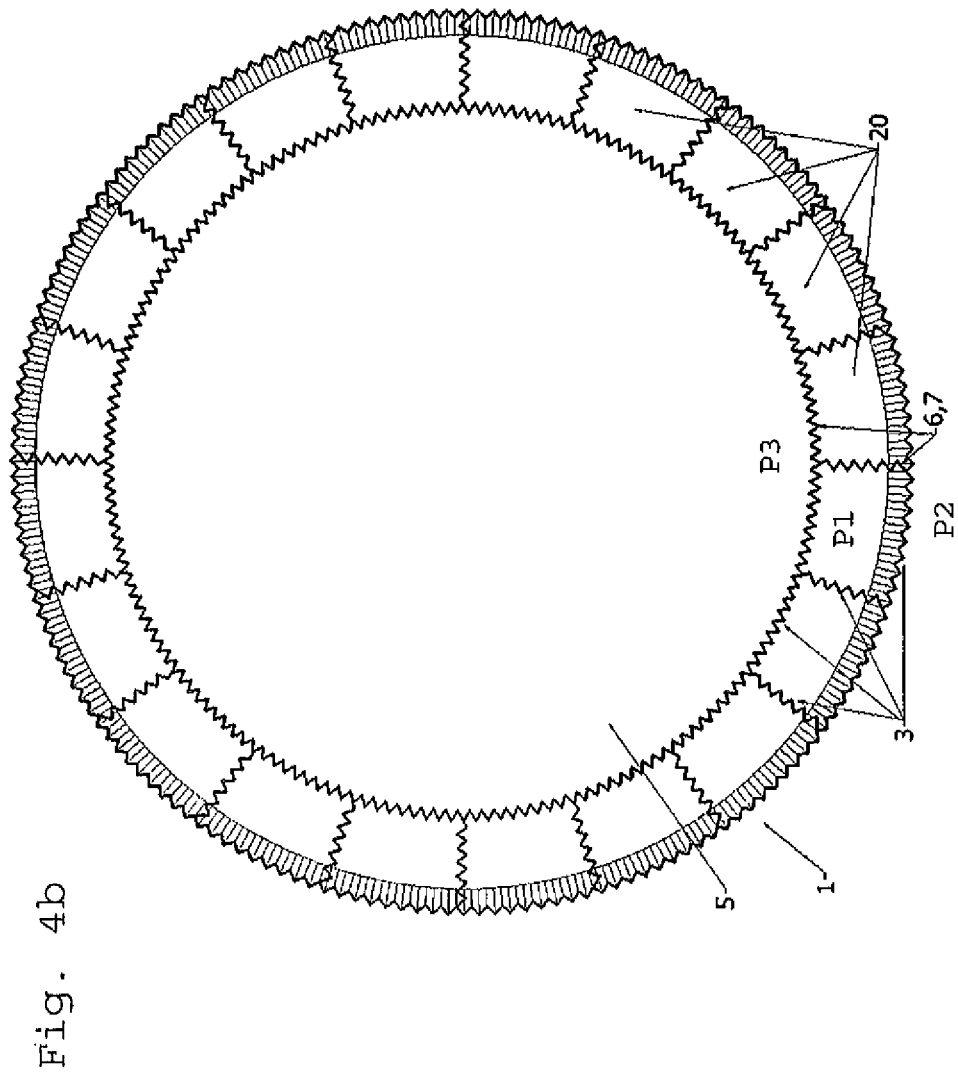
Figure 4C:
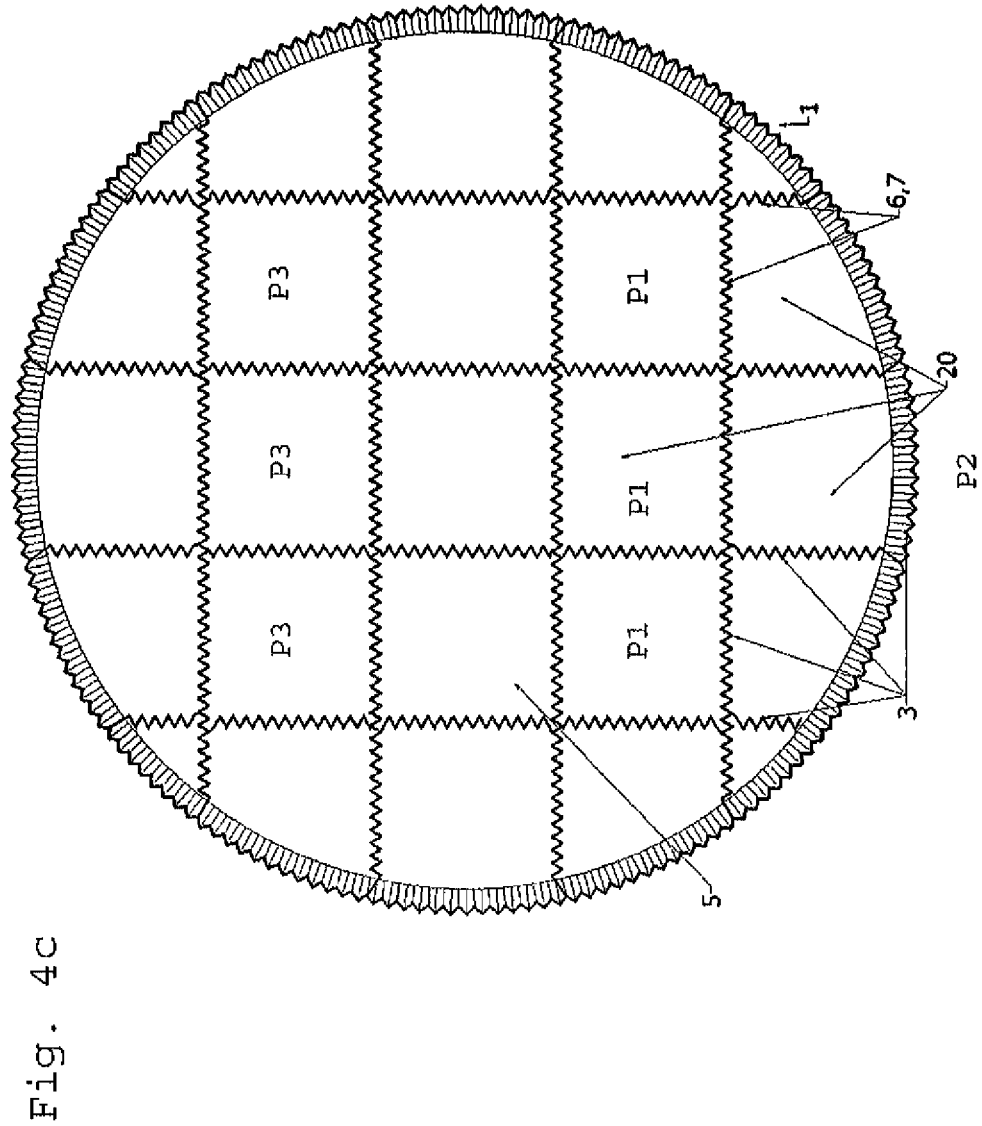
Figure 5A:
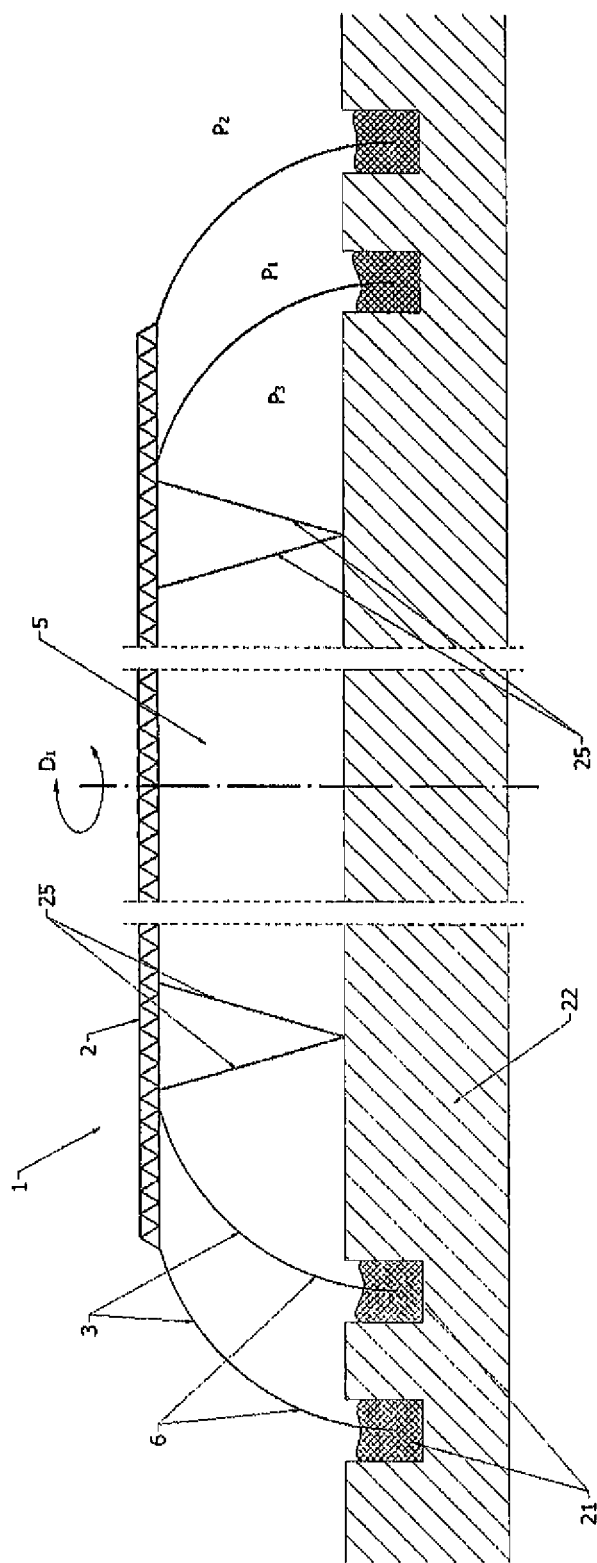
Figure 5B:
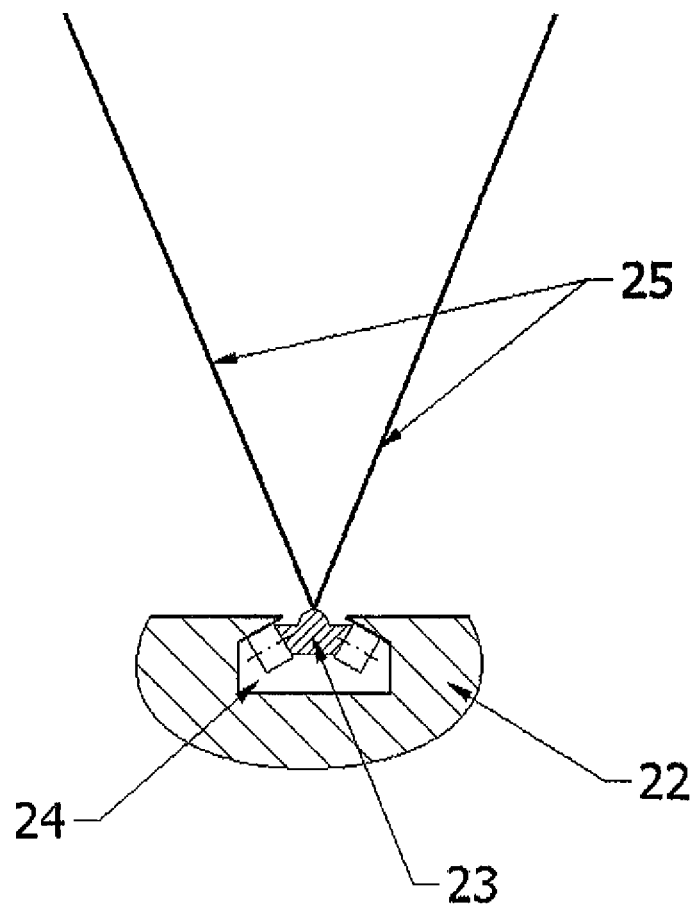

The invention will be further explained by means of preferred embodiments illustrated in the drawings, but is not intended to be restricted thereto. The drawings illustrate in detail:

FIG. 1a a longitudinal section of a floating platform according to an embodiment of the invention;

FIG. 1b a partially open perspective view of a floating platform similar to FIG. 1a;

FIG. 2 a schematic illustration of a further embodiment of the platform according to the invention;

FIG. 3a a perspective total view of a floating platform according to a further embodiment of the invention;

FIG. 3b a partially open perspective view of the floating platform pursuant to FIG. 3a;

FIG. 3c another partially open perspective view of the platform illustrated in FIG. 3a and FIG. 3b;

FIG. 3d an enlarged illustration of a section of the floating platform pursuant to FIGS. 3a to 3c;

FIGS. 4a to 4c each schematically a cross-section of a floating platform pursuant to further embodiments of the invention;

FIG. 4d a longitudinal section of a floating platform pursuant to a further embodiment of the invention;

FIG. 5a schematically a view of a platform according to the invention in an artificially built basin; and FIG. 5b an enlarged illustration of the section marked in FIG. 5a with a circle.

FIG. 1a and FIG. 1b each show a floating platform 1 having a large-area cover element 2 comprising a cover surface 2' facing away from the liquid, with a circumferential sealing element 3 fastened thereto. The sealing element 3 comprises a sealing section 3' that is in sealing contact with a liquid surface 4 illustrated in FIG. 1a by a form line. The cover element 2 confines along with the circumferential sealing element 3 a closed cavity 5 to the liquid surface 4. The cavity 5 is connected via a gas line 5' illustrated schematically in FIG. 1a with a compressed-air production apparatus 5" by means of which an over-pressure supporting the cover element 2 is producible in the cavity 5. The pressure difference between a pressure P1 in the cavity 5 and an environmental pressure P2 is adjusted such that the floating platform 1 is supported by the air cushion that fills the cavity 5 below the cover element 2 to the liquid surface 4. The required pressure difference P1–P2 depends on the surface area of the platform to be supported and hence on the loads it is to bear. The weight per area in $m^2$ or mBar pressure difference P1–P2 is, for instance, 10 kg/($m^2$·mBar). As a matter of course, another gaseous medium, in particular buoyant gases such as a noble gas, may be used instead of air in the narrower sense.

The object of the sealing element 3 is to avoid a lateral escape of the air from the cavity 5 to the environment. For this purpose, the sealing section 3' of the sealing element 3 is in sealing contact with the liquid surface 4. So far, bulky, in particular ring-shaped or tubular floating bodies have been provided as sealing elements 3 in such platforms 1, which were, in particular in the case of an operation of the platform 1 in the open sea, susceptible to disturbances by wave movements. For achieving a material-saving and cost-efficient platform 1, the sealing element 3 in accordance with the invention is formed as a circumferential wall 6. Accordingly an essentially 2-dimensional or laminar sealing element 3 is provided whose comparatively small cross-sectional area offers only very slight resistance in particular to vertical wave movements. Advantageously, an isolation of the cover element 2 from the water body can thus be enabled to the greatest possible extent.

In the embodiment of the platform 1 illustrated in FIG. 1a the wall-shaped sealing element 3 is formed by a self-contained membrane 7 that is adapted to flexibly yield to impacting wave and/or wind forces. The membrane 7 is formed integrally with the edge of the cover surface 2' of the cover element 2. When the platform 1 is used in an artificial basin on shore, as described in detail in connection with FIG. 5, the wall 6 may also be formed as a rigid wall portion, for instance, of sheet metal or the like.

The illustrated platform 1 may be used for the most varying purposes, wherein a helicopter landing place and an oil platform are mentioned as examples. In a particularly preferred embodiment the platform 1 is designed as a floating solar plant. For this purpose, the cover element 2 comprises a cushion-shaped concentrator 8 in which the solar radiation penetrates a membrane 9 that is transparent at least in sections, is subsequently reflected at a reflector membrane 10, and concentrated in an absorber 11. For achieving curved sections of the reflector membrane, tensioning elements 8', for instance, ropes, rods, or membrane-like separating walls are arranged or tensioned in the interior of the concentrator 8. Additionally, the cover element 2 may comprise a series of further components required for the operation as a solar plant, such as inverters or steam turbines, which are not illustrated in the drawing for clarity purposes.

In order to reliably avoid the evading of gas from the cavity 5 it is necessary that the sealing section 3' of the wall-shaped sealing element 3 always projects to a sufficient depth under the liquid surface. Wave movements may, however, result in that the sealing section 3' is lifted above the liquid surface 4. In order to tension the membrane 7 during operation and to thus keep it safely below the liquid surface 4, a ballast element 12 is provided in the region of a bottom edge of the membrane immersed into the liquid, said ballast element 12 weighting down the membrane 7. In accordance with the embodiment of FIGS. 1a and 1b, a circumferential chamber 13 integrated into the membrane 7 is provided as a ballast element 12. The chamber 13 is filled with a suitable ballast material which includes, for instance, sand, concrete, or a metal. To compensate for the weight of the ballast element 12 partially or completely and to thus relieve the entire structure, a buoyant element 14 may be provided which may be formed by a further chamber 13' of the membrane 7. As may be gathered from FIG. 1a, the circumferential chamber 13' floats on the liquid surface 4. In an embodiment of simple construction, the chamber 13' is an air-filled hollow chamber. In a rigid design of the sealing element 3 such ballast element 12 may be renounced.

The wall as the cover element 2 is kept by the gas-filled cavity 5 at a particular distance above the liquid surface, said distance being expediently between one and twenty wave amplitudes to be assumed maximally at the desired location. In order to specifically apply buoyant forces to the platform 1 and/or to stabilize the platform, a plurality of floating and/or buoyant bodies 15 are fastened at the underside of the cover element 2. In the embodiments pursuant to FIG. 1a and FIG. 1b elongate, tubular buoys 16 are provided as floating and/or buoyant bodies 15, which are positioned substantially perpendicular in the liquid during operation. At their upper ends the tubular buoys 16 project through the liquid surface 4. The small cross-section areas of the tubular buoys 16 offer only a very small resistance to the arriving waves, so that only low forces are transferred to the platform 1 even in the case of a rough sea. For fastening the floating and/or buoyant bodies 15 to the platform 1, compression-resistant connecting elements 17 are provided which have the shape of rods in the illustrated embodiment. For even distribution of the impacting forces, the floating and/or buoyant bodies 15 are mutually connected via connecting elements 18. In the illustrated embodiment, rod-shaped connecting elements 18 engage the floating bodies and/or the connecting elements 17 crosswise or in a framework manner, respectively.

FIG. 2 schematically illustrates a modified embodiment of the platform 1, wherein the bottom edge of the wall-shaped sealing element 3 is connected with the lateral edge region of the cover surface 2' of the cover element 2 via a connecting element 18, for instance, a rope or the like. Moreover, a further connecting element 18 engages the bottom edge of the wall-shaped sealing section 3, the other end of which is fastened further inside at the cover element 2. The connection with a rope and/or the tensioning of the wall-shaped sealing element 3 results in a curved shape of the sealing element 3 by which a material surplus suited for the flexible yielding to the wave movement is achieved. At the bottom edge of the sealing element 3 a dive buoy with an integrated stabilization body 19 is moreover fastened, by which the rope-shaped connecting elements 18 and/or the sealing element 3 are tensioned. In the case of a rigid design of the connecting elements 18 a buoyant body 15 may also be provided instead of the stabilization body 19, by means of which a buoyant force is exerted on the sealing element 3.

FIGS. 3a to 3d each illustrate a further embodiment of the platform 1 in which a series of floating and/or stabilization bodies 15, 19 are fastened at the underside of the cover element 2. The stabilization bodies 19 designed in the kind of drift anchors and/or dive buoys each comprise a section 19' that is oriented substantially horizontally during operation and offers high resistance to a vertical wave and hence has a stabilizing effect on the height of the cover element 2 above the liquid surface 4. The stabilization body 19 comprises, above and/or below the horizontal section 19', vertical sections 19" protruding substantially radially from a central axis and counteracting forces acting in parallel to the main extension plane of the platform 1. For connection with the cover element 2, the stabilization body 19 comprises a rigid connecting element 17 directly joining the underside of the cover element 2. The connecting element 17 is designed in the kind of a framework, wherein longitudinal members are connected with each other by a plurality of angled transverse members. This arrangement withstands high pressures, wherein the attacking wave forces are transferred to the platform 1 in a small amount only.

As may be gathered in particular from the enlarged illustration pursuant to FIG. 3*d*, the sealing section 3' of the sealing element 3 that is formed by a membrane 7 comprises regions arranged at regular intervals which are each weighted down with a ballast element 12. The elongate ballast elements 12 that are arranged substantially vertically during operation are fastened at the bottom edge of the sealing section 3' of the sealing element 3 via a rope or rod-shaped connecting element 17. Accordingly, the ballast elements 12 are, in contrast to the embodiment explained by means of FIGS. 1*a* and 1*b*, not integrated in the membrane 7, but are fastened at the membrane 7 as separate parts. The sealing section 3' of the sealing element 3 is folded, wherein a respective ballast element 12 engages at the joint edge of two angled regions of the sealing section 3'. This way there results a two-row arrangement of the ballast elements 12. The folded arrangement of the sealing element 3 enables during operation a mutual displacement of the individual regions of the sealing section 3' so as to be able to flexibly yield to the wave forces introduced. In an alternative embodiment (not illustrated in the Figures) there is provided that the sealing section 3' of the sealing element 3 extends wavelike.

In order to relieve the section of the sealing element 3 positioned outside the liquid, a respective buoyant element 14 is provided at the regions of the sealing section 3' which are free from the ballast elements 12, wherein each buoyant element 14 is formed by a chamber 13' integrated in the membrane 7. During operation, the buoyant elements 14 float on the liquid surface 4.

The platform 1 may have a diameter of approx. 10 meters in the case of inland waters with few waves up to several kilometers, so that very varying forces may act on the different places of the platform 1. For an even distribution of the impacting forces the stabilization bodies 19 are mutually tensioned via rope and/or rod-shaped connecting elements 18. For mechanical stabilization of the platform 1 it has turned out favorable if at least 2 connecting elements 18 engage each stabilization body 19, which are each connected crosswise with at least one other stabilization body 19.

FIGS. 4*a* to 4*c* each illustrate schematically a cross-section through a platform 1, wherein the closed cavity 5 below the cover element 2 is divided by at least one further wall-shaped sealing element 3 into individual partial chambers 20. The division of the cavity 5, on the one hand, ensures the dead-weight capacity of the platform 1 in the case of a pressure loss in any of the partial chambers 20. Additionally, varying pressures P1, P3 may be adjusted in the partial chambers by means of the compressed-air production apparatus 5' (cf. also FIG. 5). With a suitable arrangement of the partial chambers 20 relative to the central axis of the platform 1 this enables that the platform 1 is adapted to be tilted in the case of need, i.e. swiveled about an axis extending in the main extension plane of the platform 1 or of the cover element 2, respectively. A tilting of the platform 1 may, for instance, be expedient if rain water has accumulated on the cover element 2 which is to be discharged to the surrounding liquid.

Moreover, the swiveling ability of the platform 1 may be used for tracking the platform 1 with respect to the position of the sun if the platform 1 is designed as a solar plant. The tracking of the platform 1 serves to always care for an optimal orientation of solar collectors arranged on the platform 1 with respect to the sun. In addition to the tilting of the platform 1 it is favorable for the specific orientation of the sun collectors with respect to the position of the sun if the platform 1 is adapted to be rotated about its vertical axis (cf. axis D1 in FIG. 4*d* and/or FIG. 3*a*). The rotating of the platform 1 about the axis D1 extending perpendicular to the liquid surface 4 during operation may, for instance, be performed by a drive device (not illustrated in the Figures) engaging laterally at the platform 1.

In accordance with FIG. 4*a*, the partial chambers 20 are formed as outer and inner circular rings arranged concentrically about the central axis of the platform 1. FIG. 4*b* illustrates an embodiment modified with respect to FIG. 4*a*, wherein further wall-shaped sealing elements 3 are arranged between the outer and inner circular rings, which are positioned substantially perpendicular to the outer and/or inner circular rings. In the embodiment pursuant to FIG. 4*c*, the cavity is divided in the kind of a checkerboard by means of wall-shaped sealing elements 3 extending perpendicular to each other.

FIG. 4*d* illustrates in particular that an undesired deflection of the cover element 2 may be avoided by adapting the pressures P3, P1 in the partial chambers 20 of the cavity 5, so that a horizontal arrangement of the cover element 2 is achieved to the greatest possible extent during operation. The forces occurring are illustrated with arrows. In FIG. 4*d*, a framework-like reinforcing element 26 arranged circumferentially at the bottom edge of the sealing element 3 is moreover illustrated schematically, having connecting elements 18 arranged or tensioned therebetween which counteract the pressure P1 in the outer partial chamber 20.

The afore-described platform 1 may be used particularly as a floating solar plant in a natural or an artificially built water body. FIG. 5 exemplifies artificially built basins 21 in which the floating platform 1 is positioned. The basins 21 are arranged in a ground surface 22. The cavity 5 below the cover element 2 is divided by a further sealing element 3 into an inner and an outer partial chamber 20 which are supplied with compressed air independently of each other (cf. the pressures P1, P2, P3 in FIG. 5*a*).

As may particularly be gathered from the detailed illustration of FIG. 5*b*, tensile elements 25 by which it is possible to transfer in particular forces attacking laterally at the platform 1 (e.g. wind gusts) to the ground surface 22 are arranged and/or tensioned between the cover element 2 and a slide 23 that is mounted to be displaced in a rail element 24 integrated in the ground surface 22.

The invention claimed is:

1. A floating platform having a flat cover element and a sealing element which is connected to the cover element, makes a sealing contact with a liquid surface during operation and encloses a closed cavity together with the cover element and the liquid surface or a bottom surface, in which cavity an overpressure which supports the cover element is producible by a compressed-air production apparatus, wherein the sealing element is flat and comprises
at least one wall arranged circumferentially to the cavity and
a sealing section arranged substantially perpendicular to the liquid surface during operation, the sealing section having a cross-sectional extension and having a perpendicular extension, the perpendicular extension extending in a direction perpendicular to the liquid surface, the cross-sectional extension being smaller than the perpendicular extension, and wherein a flexible membrane is provided as the circumferential wall; wherein the sealing section of the sealing element is weighted down by at least one ballast element; and wherein the sealing section of the sealing element comprises a plurality of regions that are each weighted down with a ballast element and that are each separated by a region of the sealing section of the sealing element which is free from the ballast element.

2. The floating platform according to claim 1, wherein the membrane is ring-shaped.

3. The floating platform according to claim 2, wherein the sealing section of the sealing element comprises a buoyant element formed by a further chamber of the flexible membrane.

4. The floating platform according to claim 1, wherein the sealing element joins an edge of a cover surface of the cover element.

5. The floating platform according to claim 1, wherein the sealing element is formed integrally at least with an edge of a cover surface of the cover element.

6. The floating platform according to claim 1, wherein the closed cavity is divided into at least two partial chambers by at least one further sealing element.

7. The floating platform according to claim 6, wherein the partial chambers form at least one outer and one inner circular ring.

8. The floating platform according to claim 7, wherein the closed cavity is divided by a plurality of sealing elements that are arranged substantially in the shape of a honeycomb or a checkerboard.

9. The floating platform according to claim 1, wherein the sealing section of the sealing element is folded or undulated in the region free from the ballast element.

10. The floating platform according to claim 1, wherein a chamber of the membrane is filled with a ballast material and is provided as the ballast element.

11. The floating platform according to claim 10, wherein the ballast material comprises sand or concrete.

12. The floating platform according to claim 10, wherein the chamber is formed at a free end region of the sealing section.

13. The floating platform according to claim 1, wherein the cover element and/or the sealing element is connected with at least one floating and/or buoyant body immersed at least partially into the liquid during operation.

14. The floating platform according to claim 13, wherein a tubular buoy is provided as the floating and/or buoyant body.

15. The floating platform according to claim 13, wherein a plurality of floating bodies and/or stabilization bodies are fastened annularly at the sealing element and/or arranged symmetrically with respect to a vertical symmetry axis of the cover element.

16. The floating platform according to claim 13, wherein at least two floating and/or stabilization bodies are connected with each other via connecting elements selected from the group consisting of tubes, rods, ropes, and frameworks.

17. The floating platform according to claim 1, wherein the cover element, the sealing element and/or the buoyant body are connected with a drift anchor which is at least partially immersed into the liquid during operation.

18. The floating platform according to claim 1, wherein the cover element is, in particular via an adjustable buoyancy force of the floating body and/or a chamber of the membrane, adjustable in height and/or mounted to be rotated about an axis of rotation extending in the main extension plane of the cover element.

19. The floating platform according to claim 1, wherein the cover element and/or the sealing element is connected via a tensile element with a slide that is mounted to be displaced in a rail element arranged at the ground surface.

20. The floating platform according to claim 1, wherein the at least one ballast element comprises metal or concrete.

* * * * *